United States Patent
Müller et al.

(10) Patent No.: US 7,716,996 B2
(45) Date of Patent: May 18, 2010

(54) WHEEL, TEST STAND AND METHOD FOR DETERMINING AERODYNAMIC CHARACTERISTICS OF A TEST VEHICLE

(75) Inventors: Reiner Müller, Muehlacker (DE); Hauke Stumpf, Höfingen (DE); Hans-Peter Loda, Neuhausen/Schellbronn (DE); Winfried Eckert, Renningen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 12/062,540

(22) Filed: Apr. 4, 2008

(65) Prior Publication Data

US 2008/0257068 A1 Oct. 23, 2008

(30) Foreign Application Priority Data

Apr. 18, 2007 (DE) .................. 10 2007 018 192

(51) Int. Cl.
*G01L 1/22* (2006.01)
(52) U.S. Cl. .................. 73/862.044; 73/115.07; 73/117.01
(58) Field of Classification Search ................. 73/862.041–862.046, 121–132, 115.07, 73/117.01–118.01
See application file for complete search history.

(56) References Cited

U.S. PATENT DOCUMENTS

| | | | | |
|---|---|---|---|---|
| 3,949,339 A | * | 4/1976 | Kennedy | 336/135 |
| 4,986,114 A | * | 1/1991 | Rothmann et al. | 73/116.06 |
| 5,540,108 A | * | 7/1996 | Cook et al. | 73/862.041 |
| 5,817,951 A | * | 10/1998 | Cook et al. | 73/862.041 |
| 5,894,094 A | | 4/1999 | Kuchler et al. | |
| 6,427,528 B1 | * | 8/2002 | Yamakado et al. | 73/121 |
| 6,681,646 B1 | * | 1/2004 | Bacher et al. | 73/862.08 |
| 7,174,776 B2 | * | 2/2007 | Temkin et al. | 73/117.03 |
| 7,360,443 B2 | * | 4/2008 | Kerschbaum et al. | 73/856 |

FOREIGN PATENT DOCUMENTS

| | | |
|---|---|---|
| DE | 36 12 599 C2 | 10/1987 |
| DE | 38 31 795 A1 | 3/1990 |
| DE | 42 40 128 C1 | 5/1994 |
| DE | 196 27 385 A1 | 1/1998 |
| DE | 10 2004 030 741 B3 | 1/2006 |
| DE | 10 2005 040 445 A1 | 3/2007 |
| GB | 2 096 777 A | 10/1982 |

OTHER PUBLICATIONS

Ahmed, et al. "Aerodynamik des Automobils: Strömungsmechanik, Wärmetechnik, Fahrdynamik, Komfort", journal, dated Sep. 2005, pp. 909-912, Friedr. Vieweg & Sohn Verlag/GVW Fachverlage GmbH, Wiesbaden, Germany.

* cited by examiner

*Primary Examiner*—Max Noori

(57) ABSTRACT

A wheel is provided for a test vehicle. The wheel has a rim and a hub, and whereby at least one force sensor is placed in the flux of force between the hub and the rim. A test stand is provided with the test vehicle that has multiple vehicle wheels and one or more of these vehicle wheels is embodied as a wheel with a force sensor placed between the hub and the rim. An appropriate procedure is provided for determining the aerodynamic characteristics of the test vehicle. Especially with a test stand equipped with a wide belt, the forces relevant to measurement of the drag coefficients can be reliably measured with the aid of the specific wheel with the force sensor. Use of overhead scales that have an undesired effect on the flow can be dispensed with.

12 Claims, 3 Drawing Sheets

WHEEL, TEST STAND AND METHOD FOR DETERMINING AERODYNAMIC CHARACTERISTICS OF A TEST VEHICLE

CROSS-REFERENCE TO RELATED APPLICATION

This application claims the priority, under 35 U.S.C. §119, of German application DE 10 2007 018 192.4, filed Apr. 18, 2007; the prior application is herewith incorporated by reference in its entirety.

BACKGROUND OF THE INVENTION

Field of the Invention

The invention relates to a wheel for a test vehicle, whereby the wheel has a rim and a hub. The invention also relates to a test stand with a test vehicle, which has multiple vehicle wheels. The invention also relates to a procedure for determining aerodynamic characteristics of a test vehicle with multiple vehicle wheels.

For wind-tunnel measurement of aerodynamic forces and moments acting on a vehicle, so-called wind-tunnel scales are known to be used. For example, such scales are described in the reference entitled "Aerodynamics of Automobiles", by Wolf-Heinrich Hucho, Vieweg & Son Publishers—GWV Specialty Publishers GmbH, Wiesbaden, 2005. Known wind-tunnel scales are very expensive in design terms and, owing to their mode of construction, require much space.

BRIEF SUMMARY OF THE INVENTION

It is accordingly an object of the invention to provide a wheel, a test stand and a method for determining aerodynamic characteristics of a test vehicle that overcomes the above-mentioned disadvantages of the prior art devices and methods of this general type, which makes possible precise measurement of forces acting on a test vehicle, especially of aerodynamic forces, while avoiding the known disadvantages from the state of the art.

The problem is solved by a wheel for a test vehicle, whereby the wheel has a rim and a hub, whereby at least one force sensor is placed between the hub and the rim. With the aid of such a wheel, forces acting on a test vehicle can be reliably determined. Especially advantageous is application in a wind tunnel, whereby the use of expensive wind-tunnel scales can be dispensed with. According to the invention, forces acting on the test vehicle can be determined with particular precision and reliability, since with the aid of the force sensor placed in the wheel, forces can be measured near to the contact point of the test vehicle's wheel.

Here it is appropriate that the force sensor be placed in the flux of force between the hub and the rim.

It can be advantageous for the force sensor to be configured to measure a force in the vertical direction. In a wind tunnel, this especially makes possible reliable and precise determination of lift and down forces.

Preferably the force sensor can be configured to at least measure radial forces.

In an advantageous further embodiment of the invention, the force sensor can be configured to at least detect forces in a lateral direction and/or a longitudinal direction of the test vehicle.

It can be advantageous for the force sensor to have at least one bearing device as well as one or more sensor elements and a housing.

It can be advantageous for the force sensor to have strain gages for recording the forces acting on the bearing device.

It can be advantageous for the housing of the force sensor to be flanged onto the hub.

It can be advantageous for the force sensor to be coupled to the rim with the assistance of the bearing device.

The problem is also solved by a test stand with a test vehicle that has multiple vehicle wheels, whereby one or more of these vehicle wheels are configured as the wheels discussed above.

It can be advantageous to embody the test stand as an aerodynamic test stand such as a wind tunnel.

It can be advantageous for the test stand to have a propellable belt on which the wheels of the test vehicle could be supported. Such a belt, preferably a wide track, in connection with a test vehicle on each of whose wheels at least one force sensor is placed between the hub and the rib, make possible an extremely comprehensive, reliable and precise measurement, and repeatable measurement of aerodynamic forces. Here the so-called overhead scales, which have an undesired effect on the flow, and the wind-tunnel scales as they are known from the state of the art, can be dispensed with.

It can be advantageous for a device to be provided for restraining the test vehicle.

It can be advantageous to have one or more of the devices for restraining the test vehicle be assigned to one or more measuring devices.

It can be advantageous to provide a steering device for the test vehicle.

The problem is also solved by a procedure for determining aerodynamic characteristics of a test vehicle with multiple vehicle wheels, whereby at least one of the vehicles wheels is configured as a wheel as described above, and which has a force sensor, whereby at least one force in the vertical direction is detected with the aid of the force sensor.

It can be advantageous for a force also in a lateral direction and/or a force in a longitudinal direction to be detected with the aid of the force sensor.

It can be advantageous to use a longitudinal securing device for the test vehicle, which is coupled to at least one measuring device.

It can be advantageous when using measurement values of the at least one measuring device, to determine the aerodynamic drag of the test vehicle plus the rolling friction, and using the measurement value of the force sensor or sensors, to determine the aerodynamic drag of the test vehicle without rolling friction.

Other features which are considered as characteristic for the invention are set forth in the appended claims.

Although the invention is illustrated and described herein as embodied in a wheel, a test stand and a method for determining aerodynamic characteristics of a test vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTIONS OF THE SEVERAL VIEWS OF THE DRAWING

DETAILED DESCRIPTION OF THE INVENTION

Figure 1:
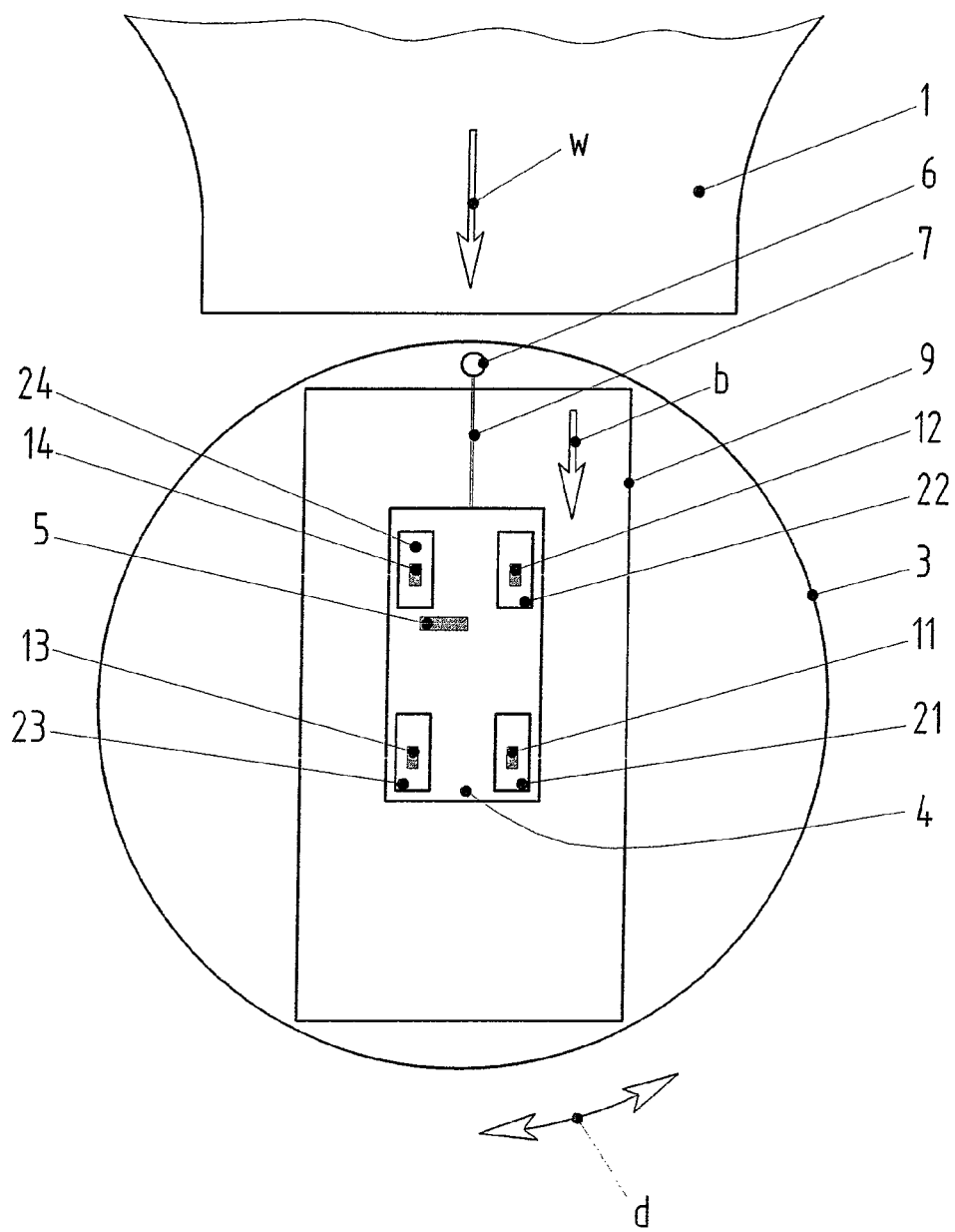
FIG. 1 is a diagrammatic, illustration of an aerodynamic test stand according to the invention.

Referring now to the figures of the drawing in detail and first, particularly, to FIG. 1 thereof, there is shown in a schematic depiction a test stand for determining aerodynamic characteristics of a test vehicle 4. The test stand can, for example, be embodied as a wind tunnel with a nozzle 1, whereby via the nozzle 1 a wind vector w is defined. The test vehicle 4 is turned toward the nozzle 1. In the example shown, a steering device 5 is provided for the test vehicle 4. The test vehicle 4 can, however, also be kept in the lane by a driver. In the example shown, a device is provided for turning the test vehicle 4, which, for example, can be embodied as a turntable 3 with two turning directions d. In the example shown, there is a belt 9, on which the wheels 21, 22, 23, 24 are supported. The belt 9 can be driven so that the surface of the belt 9 moves in movement direction b, and the wheels 21, 22, 23, 24 of test vehicle 4 roll on the belt 9.

With the aid of the belt 9, in the wind tunnel, both the kinematics of relative motion between the vehicle and the road and the kinematics of the vehicle's turning wheels can be reproduced. Instead of the wide belt 9 shown in FIG. 1, each wheel, 21, 22, 23 and 24 can have a small moving belt provided, to reproduce the kinematics of the turning wheels. The small moving belts for the wheels can be expanded by a further moving belt into a so-called five-belt test arrangement. However, far more realistic test conditions result from use of a wide belt 9 as is shown in FIG. 1, with the belt 9 having at least roughly the width of test vehicle 4.

In the example shown, each of the wheels 21, 22, 23, 24 of the test vehicle 4 has a force sensor 10 (see FIG. 3) or 11, 12, 13, 14. With the aid of the force sensors 11 to 14, lateral force, lift, down forces, and rolling resistance can be determined on wheels 21 to 24. The setup, arrangement and functioning of the force sensor 10 or 11 to 14 are described in greater detail in what follows and especially in connection with FIG. 3.

In the FIG. 1 example, a longitudinal restraint 7 is provided for the test vehicle 4, whereby the longitudinal restraint 7 can be assigned to a measuring device 6. With the aid of the measuring device 6, which is assigned to the longitudinal restraint 7, the sum of aerodynamic drag and rolling resistance forces can be measured at the restraining point. The aerodynamic drag forces acting on the test vehicle 4 can be determined by subtracting the rolling resistance forces determined with the help of force sensors 11 to 14 from the sum of the aerodynamic drag and the rolling resistance forces determined with the aid of measuring device 6.

Figure 2:
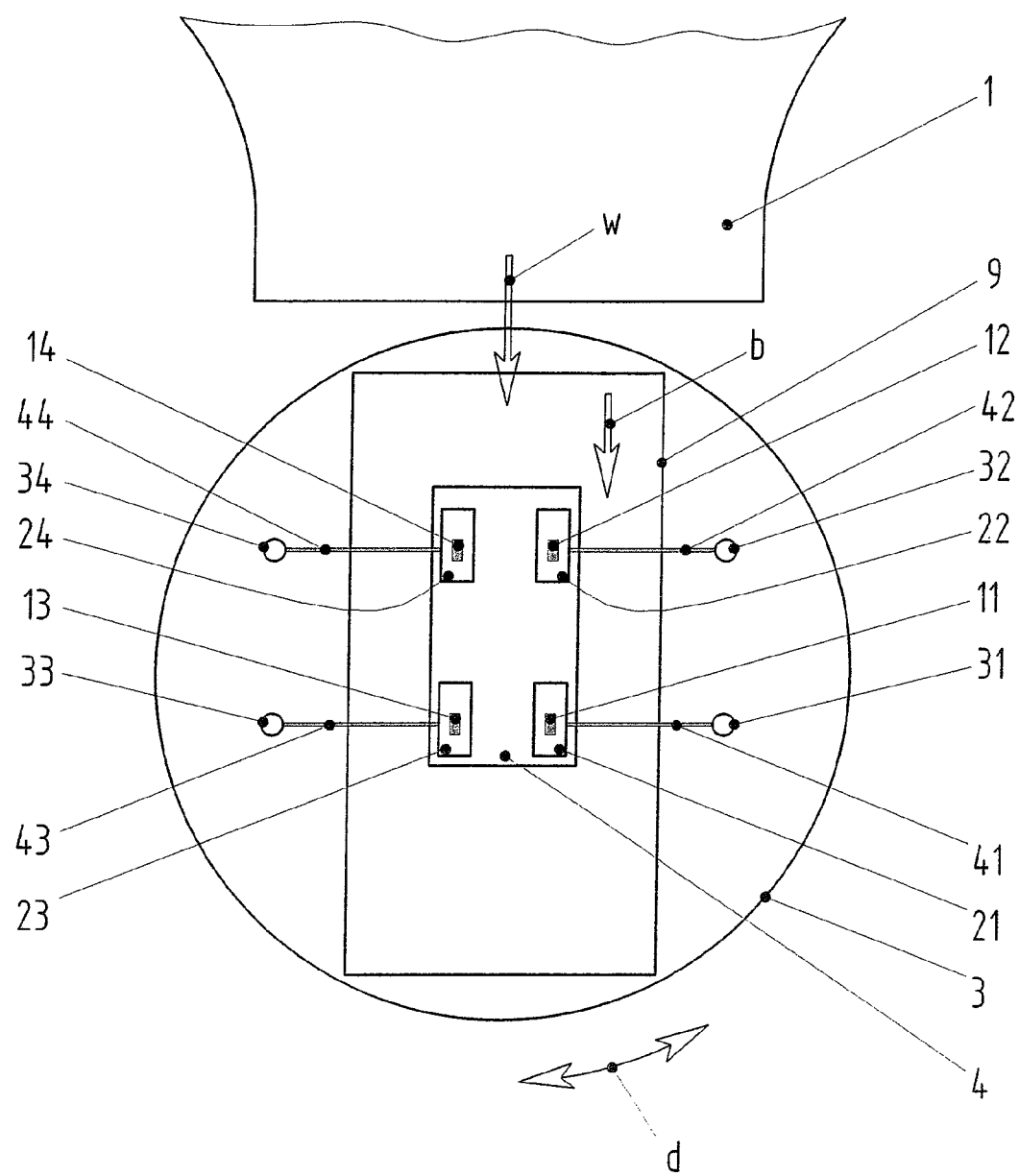
FIG. 2 is a diagrammatic, illustration of a second embodiment of the aerodynamic test stand.

FIG. 2 shows a further example of the aerodynamic test stand. Since the test stand shown here is in agreement with the example shown in FIG. 1, in the two figures identical reference symbols are used. In FIG. 2 in contrast to FIG. 1, no longitudinal restraint for the test vehicle 4 is shown. Rather, in the example as per FIG. 2, lateral devices 41, 42, 43, 44 are provided to restrain the test vehicle 4. Varying from the depiction in FIG. 2, it can be appropriate to place devices 41, 42, 43, 44 for restraining the test vehicle 4 at an angle differing by 90° from the side walls of test vehicle 4. The angles may, but do not have to be, different from each other. Preferably angles can be provided in the range from, for example, about 45° to about, for example, 135°. In the example shown, a measuring device 31, 32, 33, 34 is assigned to each device 41, 42, 43, 44 for securing.

Figure 3:
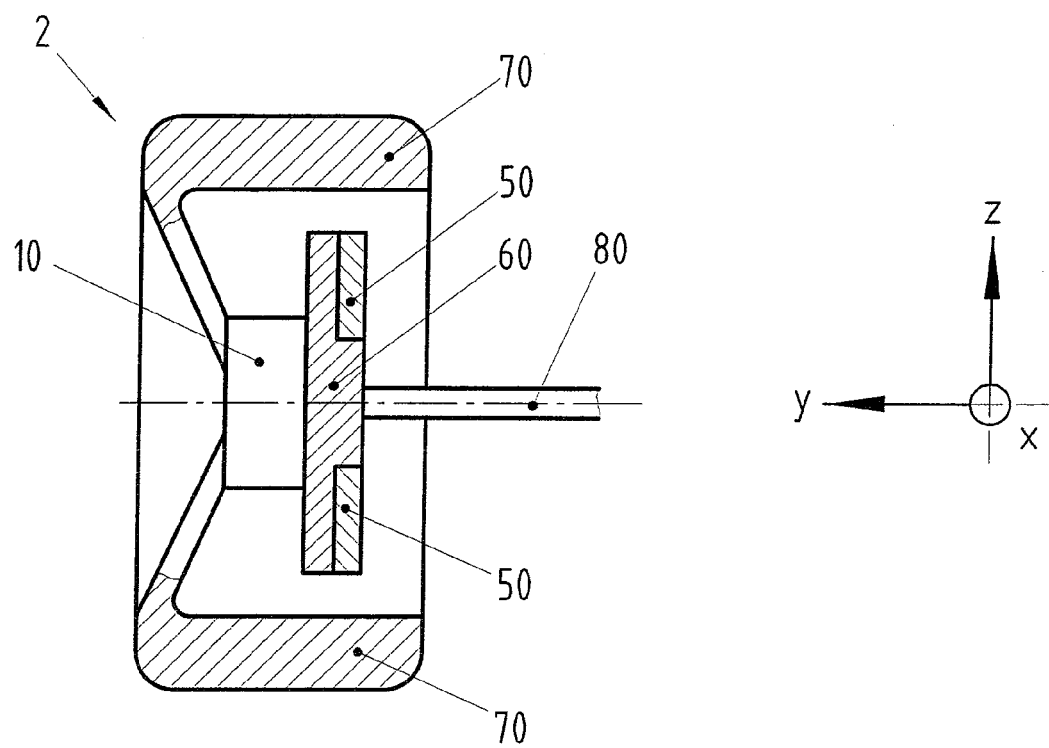
FIG. 3 is a diagrammatic, sectional view of a wheel with a force sensor according to the invention.

FIG. 3 shows an embodiment example of an invention-specific wheel 2 with at least one force sensor 10 placed between a hub 60 and a rim 70 of a wheel 2. The force sensor 10 may have one or more bearing devices that are not shown in detail, one or more sensor elements that are not shown in detail, and a housing. In the example shown, the housing of the force sensor 10 is flange-mounted onto the hub 60. The hub 60 is connected to a drive shaft 80. Additionally, the wheel 2 has a brake disk 50. With the aid of the force sensor 10, the force acting in the vertical direction z is measured close to the contact point of the wheel 2. Forces in the lateral direction y and/or in longitudinal direction x can likewise be determined with the aid of force sensor 10 and/or the help of further measuring devices 31, 32, 33, 34. With the aid of force sensor 10, depending on its setup and placement, radial forces especially can be detected. However, if the flow impinges at a slant, forces in lateral direction y can also be determined reliably.

Especially with a test stand equipped with a wide belt 9, the forces relevant to measurement of the drag coefficient can be reliably measured with the aid of the invention-specific wheel 2 with the force sensor 10. Use of an overhead scale that has an undesired effect on the flow can be dispensed with.

The invention claimed is:

1. A method for determining aerodynamic characteristics of a test vehicle having multiple vehicle wheels, each of the vehicle wheels having a rim and a hub, which comprises the steps of:
    disposing at least one force sensor between the hub and the rim of each of the vehicle wheels, the force sensor embodied at least for detecting a force in a vertical direction;
    providing an aerodynamic test stand having a propellable belt for supporting the vehicle wheels of the test vehicle and for measuring aerodynamic characteristics of the test vehicle, the aerodynamic test stand functioning as part of a wind tunnel; and
    detecting at least the force in the vertical direction with an aid of the force sensor.

2. The method according to claim 1, which further comprises detecting, via an aid of the force sensor of at least one the vehicle wheels, at least one of a force in a lateral direction and a force in a longitudinal direction.

3. The method according to claim 1, which further comprises:
    providing at least one longitudinal restraint for restraining the test vehicle; and
    coupling the longitudinal restraint to at least one measuring device.

4. The method according to claim 3, which further comprises:
    using measured values of the at least one measuring device for determining aerodynamic drag of the test vehicle and rolling friction; and
    using measurement values of at least one force for measuring the aerodynamic drag of the test vehicle without the rolling friction.

5. The method according to claim 1, which further comprises detecting radial forces with the force sensor.

6. The method according to claim 1, which further comprises detecting forces in at least one of a lateral direction and a longitudinal direction via the force sensor.

7. The method according to claim 1, which further comprises forming the force sensor with at least one bearing device, at least one sensor element, and a housing.

8. The method according to claim 7, which further comprises providing the force sensor with strain gages for detecting forces acting on the bearing device.

9. The method according to claim 7, which further comprises flange mounting the housing of the force sensor onto the hub.

10. The method according to claim 7, which further comprises coupling the force sensor to the rim with an aid of the bearing device.

11. The method according to claim 1, which further comprises providing devices on the aerodynamic test stand for restraining the test vehicle.

12. The method according to claim 11, wherein at least one of the devices for restraining the test vehicle has at least one measuring device assigned to it.

\* \* \* \* \*